United States Patent
Chiantera et al.

(10) Patent No.: US 9,367,433 B2
(45) Date of Patent: Jun. 14, 2016

(54) GENERATING INPUT VALUES FOR A TEST DATASET FROM A DATASTORE BASED ON SEMANTIC ANNOTATIONS

(71) Applicant: INTERNATIONAL BUSINESS MACHINES CORPORATION, Armonk, NY (US)

(72) Inventors: Alessandro Luigi Chiantera, Rome (IT); Claudio Falcone, Rome (IT); Ilaria Gorga, Rome (IT); Stefania Benedetta Stasi, Rome (IT)

(73) Assignee: International Business Machines Corporation, Armonk, NY (US)

(*) Notice: Subject to any disclaimer, the term of this patent is extended or adjusted under 35 U.S.C. 154(b) by 10 days.

(21) Appl. No.: 13/766,523

(22) Filed: Feb. 13, 2013

(65) Prior Publication Data

US 2014/0229917 A1    Aug. 14, 2014

(51) Int. Cl.
*G06F 11/36* (2006.01)
*G06F 9/44* (2006.01)

(52) U.S. Cl.
CPC .......... *G06F 11/3684* (2013.01); *G06F 11/368* (2013.01); *G06F 11/3672* (2013.01)

(58) Field of Classification Search
None
See application file for complete search history.

(56) References Cited

U.S. PATENT DOCUMENTS

| | | | |
|---|---|---|---|
| 5,754,755 A * | 5/1998 | Smith, Jr. ............ | G06F 11/3684 714/38.1 |
| 7,272,822 B1 | 9/2007 | Riggins et al. | |
| 7,568,183 B1 * | 7/2009 | Hardy et al. ........ | G06F 11/3684 717/121 |
| 7,793,154 B2 | 9/2010 | Chagoly et al. | |
| 7,873,944 B2 * | 1/2011 | Bangel et al. ....... | G06F 11/3664 717/124 |
| 7,913,231 B2 * | 3/2011 | Stienhans et al. ............. | 717/125 |
| 8,060,791 B2 | 11/2011 | Hayutin | |
| 8,151,247 B2 * | 4/2012 | Wefers .......................... | 717/124 |
| 8,381,197 B2 * | 2/2013 | Meenakshisundaram et al. .............................. | 717/135 |
| 8,423,879 B2 * | 4/2013 | Bhatt et al. .................... | 714/819 |
| 8,549,483 B1 * | 10/2013 | Bridges, Sr. et al. ................... | G06F 11/3684 717/126 |
| 9,274,935 B1 * | 3/2016 | Lachwani et al. .. | G06F 11/3688 |
| 2003/0005413 A1 * | 1/2003 | Beer et al. ..................... | 717/125 |
| 2004/0194065 A1 * | 9/2004 | McGrath et al. .............. | 717/124 |
| 2005/0119853 A1 * | 6/2005 | Louden et al. ................ | 702/123 |
| 2005/0257198 A1 * | 11/2005 | Stienhans et al. ............. | 717/124 |
| 2007/0061625 A1 | 3/2007 | Acosta, Jr. et al. | |
| 2009/0077422 A1 | 3/2009 | Khaladkar et al. | |
| 2009/0182756 A1 * | 7/2009 | Kang et al. .................... | 707/102 |
| 2009/0204591 A1 * | 8/2009 | Kaksonen ........................ | 707/3 |
| 2009/0217100 A1 * | 8/2009 | Grechanik et al. .... | G06F 11/368 714/38.1 |
| 2009/0282392 A1 * | 11/2009 | Russell .......................... | 717/131 |
| 2009/0287958 A1 * | 11/2009 | Bhatt et al. ..................... | 714/26 |
| 2011/0231825 A1 | 9/2011 | Grechanik et al. | |

(Continued)

OTHER PUBLICATIONS

Wikipedia, "Regression Testing," Apr. 20, 2010, downloaded from the Internet on Nov. 3, 2014 from <url>: http://web.archive.org/web/20100420212609/http://en.wikipedia.org/wiki/Regression_testing, pp. 1-3.*

Daniel et al., "Automated GUI refactoring and test script repair," 2011, Proceedings of the First International Workshop on End-to-End Test Script Engineering, pp. 38-41.*

(Continued)

*Primary Examiner* — Thuy Dao
*Assistant Examiner* — Stephen Berman
(74) *Attorney, Agent, or Firm* — Michael R. Long; David Zwick

(57) ABSTRACT

A technique for operating a user interface automation framework includes accessing a datastore that includes semantic annotations with a dataset generator. The dataset generator generates input values for a test dataset from the datastore based on the semantic annotations.

14 Claims, 8 Drawing Sheets

(56) References Cited

U.S. PATENT DOCUMENTS

| | | | | |
|---|---|---|---|---|
| 2011/0276944 | A1* | 11/2011 | Bergman et al. | 717/124 |
| 2012/0159443 | A1* | 6/2012 | Kamenz et al. | G06F 11/368 717/124 |
| 2013/0159784 | A1* | 6/2013 | Rossi | 714/47.1 |
| 2014/0181793 | A1* | 6/2014 | Kaliappan | G06F 11/3684 717/124 |
| 2015/0007146 | A1* | 1/2015 | Li et al. | G06F 11/3684 717/130 |

OTHER PUBLICATIONS

Memon et al., "Automated test oracles for GUIs," 2000, Proceedings of the 8th ACM SIGSOFT international symposium on Foundations of software engineering: twenty-first century applications, pp. 30-39.*

Grechanik et al, "Maintaining and evolving GUI-directed test scripts," 2009, ICSE '09 Proceedings of the 31st International Conference on Software Engineering, pp. 408-418.*

* cited by examiner

300

| Name | Parent Name | Relationship |
|---|---|---|
| Jones, John | Jones, James | Father of |
| Jones, John | Jones, Jenny | Mother of |
| Smith, Fred | Smith, James | Father of |

GENERATING INPUT VALUES FOR A TEST DATASET FROM A DATASTORE BASED ON SEMANTIC ANNOTATIONS

BACKGROUND

This disclosure relates generally to a user interface automation framework and, more particularly, to generating input values for a test dataset from a datastore based on semantic annotations.

A number of different tools are commercially available for automated testing of software applications. For example, Rational Functional Tester™ (RFT) is a tool for automated testing of software applications that allows software developers to create tests that mimic the actions of a human tester. RFT is primarily used by software quality assurance (SQA) teams to perform automated regression testing. A test recorder of RFT allows software developers to create test scripts that capture actions of a tester during testing of an application under development. A test script is usually produced as either a Java or Visual Basic .NET application and may be presented as a series of screen shots that form a visual storyboard. In general, test scripts may be edited using standard language commands and syntax or by interacting with screen shots in a storyboard. Test scripts can then be executed to validate functionality of an application under development. Typically, test scripts are run in a batch mode where several scripts are grouped together and run unattended.

Regression testing refers to any type of software testing that seeks to uncover new software bugs (regressions) in existing functional and non-functional areas after changes (e.g., enhancements, patches or configuration changes) have been made to the software. One of the main reasons for regression testing software is to ensure that a change to one part of the software does not adversely affect other parts of the software. Regression testing may include re-running previously executed tests and checking whether program behavior has changed and/or whether previously fixed faults have re-emerged. Regression testing can be used to test a system efficiently by systematically selecting the appropriate minimum set of tests needed to adequately cover a particular change. Regression tests can be broadly categorized as functional tests or unit tests. Functional tests exercise the complete program with various inputs. Unit tests exercise individual functions, subroutines, or objects of the program.

During the recording phase, verification points may be introduced to capture an expected system state, e.g., a specific value in a field or a given property of an object, such as enabled or disabled. During playback, any discrepancies between a baseline captured during recording and the actual results achieved during playback may be noted in a log. The tester can then review the log to determine if an actual software bug was discovered. Storyboard testing enables testers to edit test scripts by acting against screen shots of an application under test.

In RFT, an object map is the underlying technology used to locate and act against objects within an application. An object map may be automatically created by a test recorder when tests are created and typically includes a list of properties used to identify objects during playback. During playback, RFT uses the object map to locate and act against the application interface. However, during development, objects may change between the time a test script is recorded and when the test script is executed. In RFT, discrepancies between object definitions captured during recording and playback may be ignored to ensure that test script execution runs uninterrupted.

It is common for a single functional regression test to be executed multiple times with different data. To facilitate execution of a functional regression test with different data, a test recorder may automatically parameterize data entry values and store the data entry values in a spreadsheet, e.g., a test dataset. Automatic parameterization of data entry values enables a tester to add additional test data cases to a test dataset without having to modify any test code. In general, automatic parameterization of data entry values increases test coverage and the value of a given functional test. In order for RFT to interact with a given object in an application, RFT must be able to understand interfaces of an object. Understanding interfaces of an object is typically not a problem for standard objects, e.g., edit fields, buttons, and list boxes. However, in some cases, application developers create their own custom objects to meet application requirements. In the case of custom objects, developers can create an object proxy to identify and code the interfaces to the custom objects. For example, an object proxy may be created using a software development kit (SDK) interface that allows users to program in Java or .NET to add functional testing support for Java and .NET custom controls.

SUMMARY

According to one aspect of the present disclosure, a technique for operating a user interface automation framework includes accessing a datastore that includes semantic annotations with a dataset generator. The dataset generator generates input values for a test dataset from the datastore based on the semantic annotations.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

FIG. 3 is a table that includes a name list with names of individuals, names of their parents, and a relationship between the individuals.

DETAILED DESCRIPTION

Figure 1:
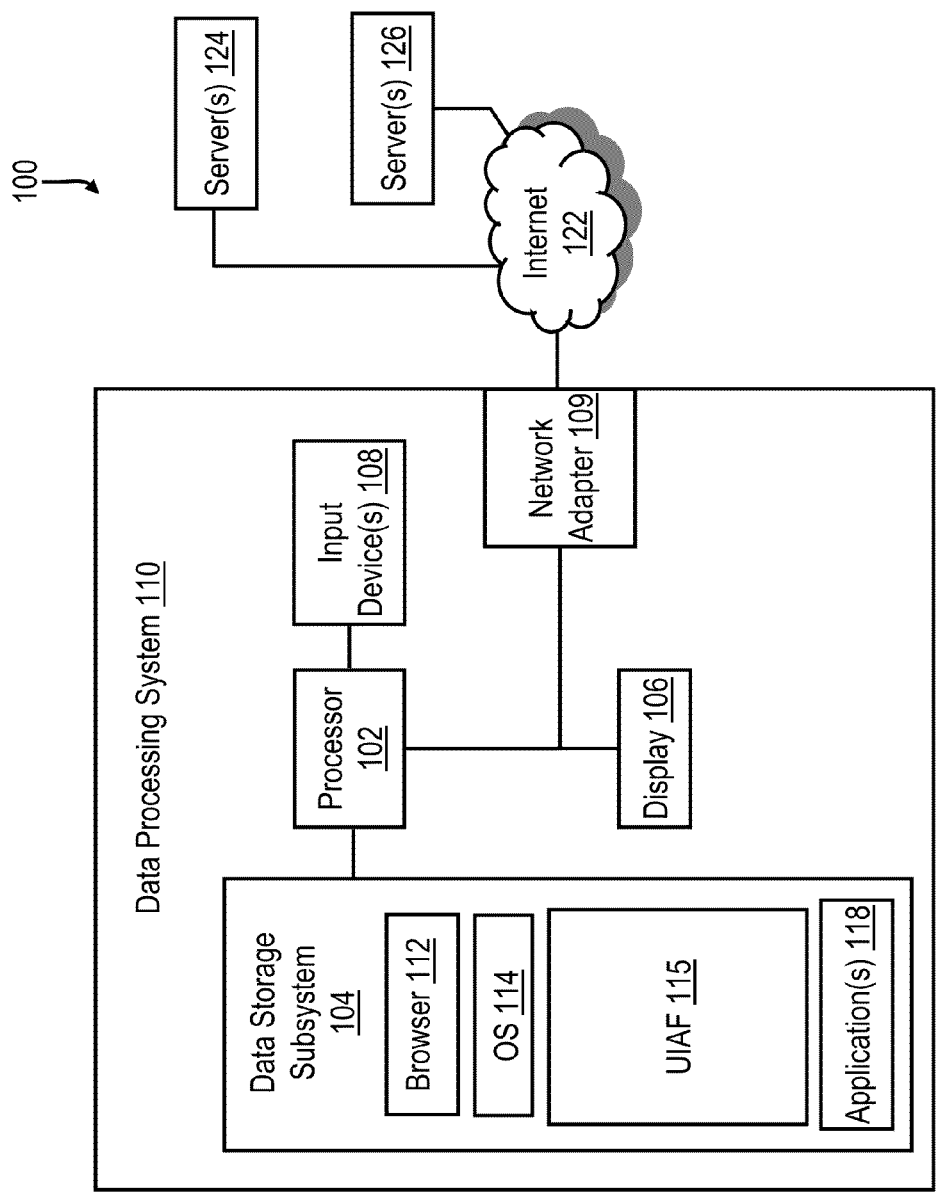
FIG. 1 is a block diagram of an example data processing environment that includes a data processing system that is configured to employ semantic annotations when mapping objects and/or creating test datasets, according to various aspects of the present disclosure.

As will be appreciated by one skilled in the art, aspects of the present invention may be embodied as a system, method, or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing, but does not include a computer-readable signal medium. More specific examples (a non-exhaustive list) of the computer-readable storage medium include: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet service provider (ISP)).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. As may be used herein, the term "coupled" includes both a direct electrical connection between blocks or components and an indirect electrical connection between blocks or components achieved using one or more intervening blocks or components.

Resource Description Framework (RDF) is a family of World Wide Web Consortium (W3C) specifications that was originally designed as a metadata data model. RDF is used as a general approach for conceptual description or modeling of information that is implemented in web resources using a variety of syntax formats. The RDF data model is similar to classic conceptual modeling approaches, such as entity-relationship or class diagrams, as RDF is based upon the idea of making statements about resources (e.g., Web resources) in the form of subject-predicate-object expressions. Subject-predicate-object expressions are known as triples in RDF terminology. The subject denotes the resource and the predicate denotes traits or aspects of the resource and expresses a relationship between the subject and the object. For example, the notion "The water has the color blue" can be represented as an RDF triple with: a subject denoting "the water", a predicate denoting "has the color", and an object denoting "blue". In general, RDF swaps the object for the subject that would be used in the classical notation of an entity-attribute-value model within object-oriented design, i.e., object (water), attribute (color), and value (blue).

RDF is a major component in Semantic Web (Web 3.0) activity, which is an evolutionary stage of the World Wide Web (WWW) in which automated software can store, exchange, and use machine-readable information distributed throughout the Web. The simple data model provided by RDF and the ability of RDF to model disparate, abstract concepts has also led to increased usage in knowledge management applications unrelated to Semantic Web activity. A collection of RDF statements intrinsically represents a labeled, directed multi-graph. As such, an RDF-based data model is more naturally suited to certain kinds of knowledge representation, as contrasted with a relational model and/or other ontological models. In practice, RDF data has often been maintained in relational databases or as native representations referred to as triple stores or quad stores if a context (i.e., a named graph) is also maintained for each RDF triple.

Object-oriented design is the process of planning a system of interacting objects for the purpose of solving a software problem and is one approach to software design. An object contains encapsulated data and procedures grouped together to represent an entity. An 'object interface', i.e., how an object can be interacted with, is also defined. An object-oriented program is described by the interaction of objects. Object-oriented design is the discipline of defining the objects and their interactions to solve a problem that was identified and documented during object-oriented analysis.

In computer science, an 'ontology' formally represents knowledge as a set of concepts within a domain and the relationships among those concepts. Ontology can be used to reason about the entities within a domain and may be used to describe the domain. In theory, an ontology is a formal, explicit specification of a shared conceptualization. An ontology renders shared vocabulary and taxonomy that models a domain with the definition of objects and/or concepts and their properties and relations. Ontologies are the structural frameworks for organizing information and are used in artificial intelligence, the Semantic Web, system engineering, software engineering, etc. as a form of knowledge representation about the world or some part of it. The meaning of ontology within the computer science context is a model for describing the world that consists of a set of types, properties, and relationship types. There is also generally an expectation that there is a close resemblance between the real world and the features of the model in an ontology.

A 'user scenario' describes in detail what users do on a website and specifically why users do what they do. A user scenario is essentially a short story of a user who visits a website with a certain motivation and a specific goal in mind. A good user scenario includes all information that is relevant to a process the user undergoes in order to reach a goal, and nothing more. User scenarios are a valuable tool when designing user interfaces. It is not only desirable to get to know actual users of a website, but also to understand the goals of the users. Only when one ascertains who does what on a website and how and why they do what they do can design requirements be concretely defined so that the design requirements can actually be met. In general, broad content offered through a website needs to narrowed down to specific goals that are summarized in user scenarios. User scenarios may be employed for the design of any kind of user interface (UI), such as a website interface, a computer program interface, or any application interface for any digital device to ensure usability and a good user experience. In sum, user scenarios are short stories that detail user motivation, user goals, and user actions on a website.

According to aspects of the present disclosure, the fact that semantic annotation and ontology are to be widely employed in the Semantic Web may be advantageously exploited to improve user interface (UI) testing. According to one or more aspects, assumptions are made that fields of a UI are (or can be) semantically annotated (e.g., using a triple RDF). It should be appreciated that an increasing number of developing frameworks are being configured to automatically create semantic annotation. By calculating an affinity between ontological concepts, object mapping rules may be applied based on detected page variations.

With reference to FIG. 1, an exemplary data processing environment 100 is illustrated that includes a data processing system 110 that is configured to employ semantic annotations in performing object mapping and/or to perform dataset generation according to one or more embodiments of the present disclosure. Data processing system 110 may take various forms, such as workstations, laptop computer systems, notebook computer systems, or desktop computer systems and/or clusters thereof. Data processing system 110 includes a processor 102 (which may include one or more processor cores for executing program code) coupled to a data storage subsystem 104, a display 106, one or more input devices 108, and a network adapter 109. Data storage subsystem 104 may include, for example, application appropriate amounts of various memories (e.g., dynamic random access memory (DRAM), static RAM (SRAM), and read-only memory (ROM)), and/or one or more mass storage devices, such as magnetic or optical disk drives.

Data storage subsystem 104 includes an operating system (OS) 114 for data processing system 110. Data storage subsystem 104 also includes application programs, such as a browser 112 (which may optionally include customized plug-ins to support various client applications), and other applications (e.g., a word processing application, a presentation application, and an email application) 118, as well as user interface automation framework (UIAF) software 115.

Display 106 may be, for example, a cathode ray tube (CRT) or a liquid crystal display (LCD). Input device(s) 108 of data processing system 110 may include, for example, a mouse, a keyboard, haptic devices, and/or a touch screen. Network adapter 109 supports communication of data processing system 110 with one or more wired and/or wireless networks utilizing one or more communication protocols, such as 802.x, hyper text transfer protocol (HTTP), simple mail transfer protocol (SMTP), etc. Data processing system 110 is shown coupled via one or more wired or wireless networks, such as the Internet 122, to various file servers 124 and various web page servers 126 that provide information of interest to the user of data processing system 110.

Those of ordinary skill in the art will appreciate that the hardware components and basic configuration depicted in FIG. 1 may vary. The illustrative components within data processing system 110 are not intended to be exhaustive, but rather are representative to highlight components that may be utilized to implement the present invention. For example, other devices/components may be used in addition to or in place of the hardware depicted. The depicted example is not meant to imply architectural or other limitations with respect to the presently described embodiments.

Figure 2:
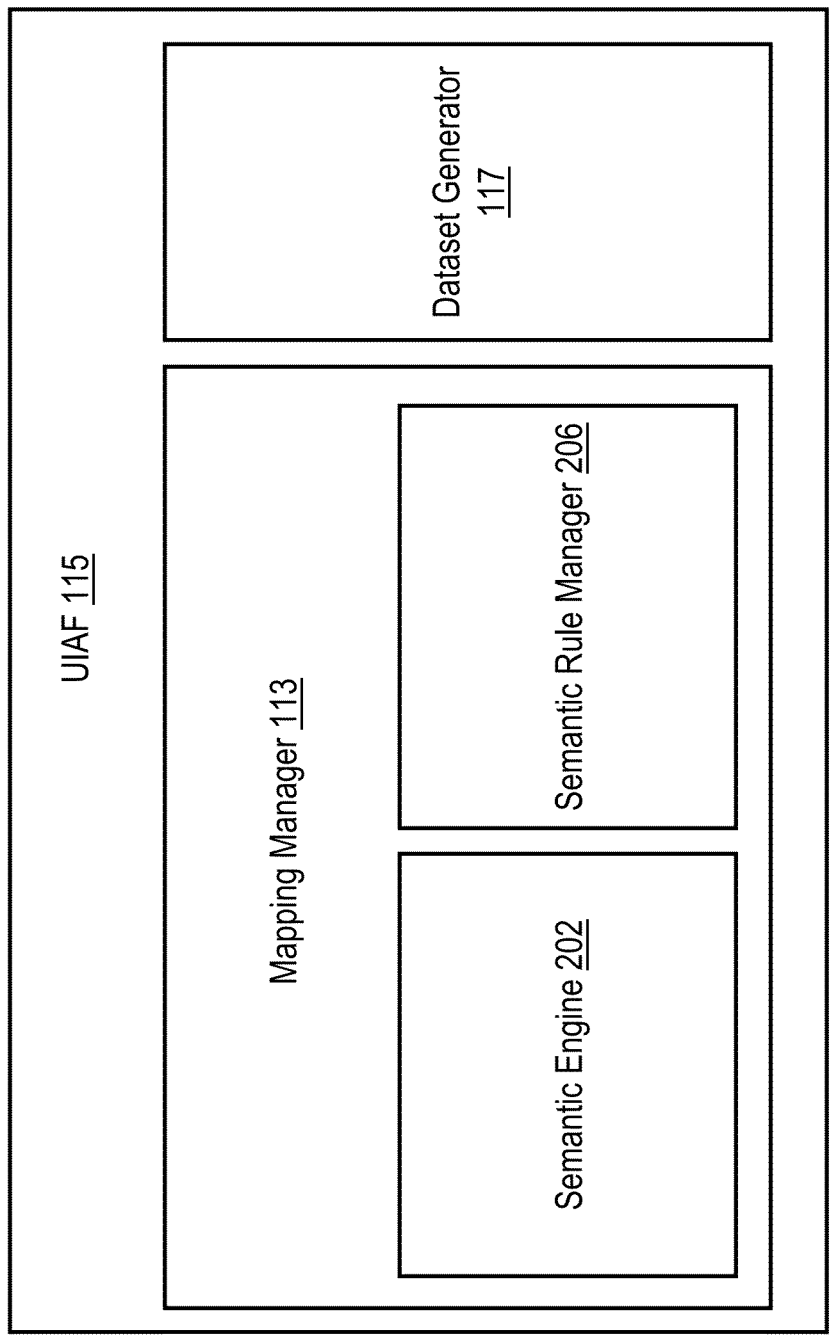
FIG. 2 is a block diagram of an example user interface automation framework (UIAF) that includes a mapping manager configured according to one aspect of the present disclosure.

With reference to FIG. 2, according to one embodiment of the present disclosure, UIAF 115 includes a mapping manger (MM) 113 configured to map objects of a user scenario with objects of a revised UI based on semantic annotations and a dataset generator (DG) 117 configured to generate datasets for UI testing based on semantic annotations. MM 113 further includes a semantic engine (SE) 202 and a semantic rule manager (SRM) 206. For example, UIAF 115 may be a framework that is configured to perform UI tests, e.g., Rational Functional Tester™ (RFT). MM 113 is configured to perform object mapping and may include both SE 202 and SRM 206. SE 202, which alternatively may be remote to MM 113, is configured to calculate an affinity between ontological concepts. SRM 206 is configured to facilitate defining rules to improve object mapping based on semantic annotation.

Web user interface (UI) tests are generally based on recorded user scenarios that may be customized. However, when a same user scenario is run on different UI versions, a conventional UIAF may have difficulty locating certain objects (i.e., objects that have changed between UI versions) associated with the user scenario. According to the present disclosure, the difficulty locating objects (e.g., objects that have been moved and/or redefined) for a user scenario in a revised UI may be reduced by employing semantic annotation. In general, employing semantic annotation improves mapping effectiveness between original objects of a user scenario (for an original UI) and modified objects of a revised UI. According to the present disclosure, a field in a revised UI that is characterized by a semantic annotation can usually be recognized when it has been moved, renamed, modified, etc.

For example, mapping effectiveness may be improved in a number of different cases. In a first case, on a web UI that is under development, a field with a set of properties may be associated using semantic annotation on the field (e.g., an association with a specific ontological concept). In this case, an affinity between ontological concepts associated with two objects may be utilized during a mapping phase between the two objects to generally provide a better mapping result. It should be appreciated that semantic information related to a particular field should remain unchanged. According to one or more aspects of the present disclosure, when object mapping is performed, ontological concepts are sent to SE 202, which returns an affinity between the ontological concepts. The affinity is then used to calculate a match between objects. For example, if an affinity between two objects is close to one there is a high probability that the objects are the same. As another example, if an affinity between two objects is close to zero there is a high probability that the objects are not the same.

In a second case, a semantic relationship between fields of a UI can be defined by, for example, a triple RDF to improve a mapping effectiveness between objects. For example, with reference to FIG. 3, table 300 includes a name list that includes names of individuals and names of their parents, along with a relationship between the individuals. If a relationship "father of" or "mother of" is defined between two fields, the relationship between the two fields should be readily established (for a check point) even if some changes are made to one or more of the two fields. As is illustrated in entry 302 of table 300, the relationship "father of" defines the relationship between 'John Jones' and 'James Jones'. For example, if the name 'John Jones' is later changed to 'Jonathan Jones', the relationship to 'James Jones' should facilitate mapping entry 302 before the name change to entry 302 after the name change. Similarly, in entry 304, the relationship "mother of" defines the relationship between 'John Jones' and 'Jenny Jones'. If the name 'Jenny Jones' is later changed to 'Jennifer Jones', the relationship to 'John Jones' should facilitate mapping entry 304 before the name change to entry 304 after the name change. Likewise, in entry 306 of table 300, the relationship "father of" defines the relationship between 'Fred Smith' and 'James Smith' and is available to map entry 306 before a name change to entry 306 and after a name change. In general, the semantic relationship between two fields of table 300 should remain unchanged when a UI is revised.

A mapping rule according to the present disclosure may be defined as follows: Object1 is the object that MM 113 is attempting to locate; ObjectRel is the object associated with Object1 by a semantic relationship (Rel1) during registration; ObjectRel2 is the ObjectRel identified after the registration; and ObjectsRes includes all objects related to ObjectRel2 by the semantic relationship (Rel1). If MM 113 is not able to recognize Object1, MM 113 may identify the ObjectRel and then map ObjectRel in the current UI and identify the ObjectRel2 relationship and the objects associated by the semantic relationship (Rel1). In this manner, the object that is the most similar to Object1 in ObjectsRes may be identified by MM 113 based on the semantic relationship (Rel1).

In a third case, when a data presentation change is implemented and mapping is based on semantic annotation, the data presentation change should not usually adversely affect mapping between objects. For example, during a scenario registration a field may be displayed as a drop-down menu, but may later be changed and displayed as a pick list or by a pop-up. Using semantic mapping, the field for the drop-down menu (in an original UI) may be readily identified as the field for the pick list or pop-up (in a revised UI).

Figure 4:
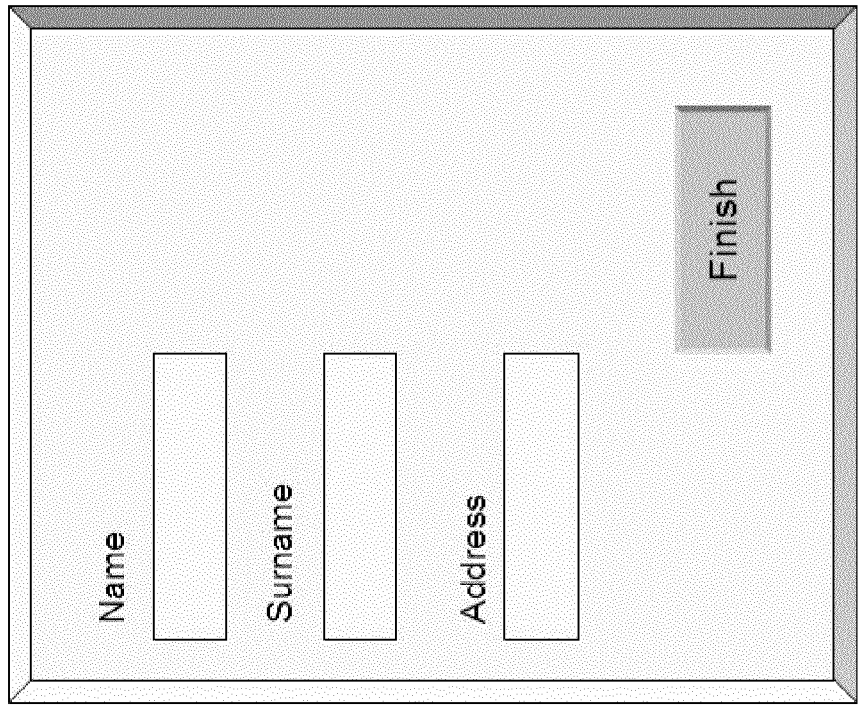
FIG. 4 illustrates a user interface (UI) page.
Figure 5:
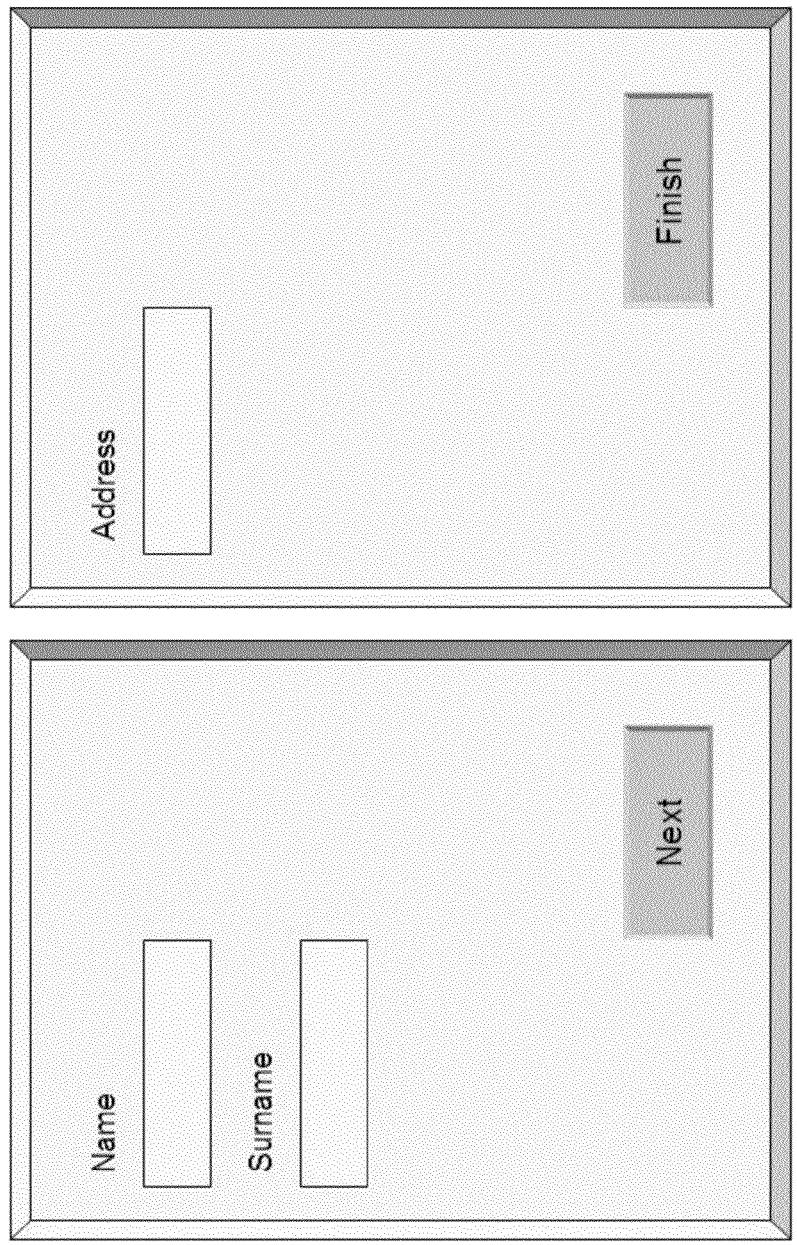
FIG. 5 illustrates two UI pages that are derived from the UI page of FIG. 4.

With reference to FIGS. 4 and 5, in a fourth case actions are semantically annotated in order to support the situation in which a field is moved to a different page. For example, after a scenario registration a UI page 400 may be split into two pages 500 and 502 linked by a 'next' button. The 'next' button can be associated with an ontological concept such that UIAF 115 can infer that the field that is not on page 500 can be found using a 'next' action. For example, a semantic rule for the inference may be defined as follows: if the object is not present on a UI page and the rule "next" is defined on the same object and the rule "next" was not present during user scenario registration, the object can be located on a result page obtained by selecting the "next" button.

Figure 6:
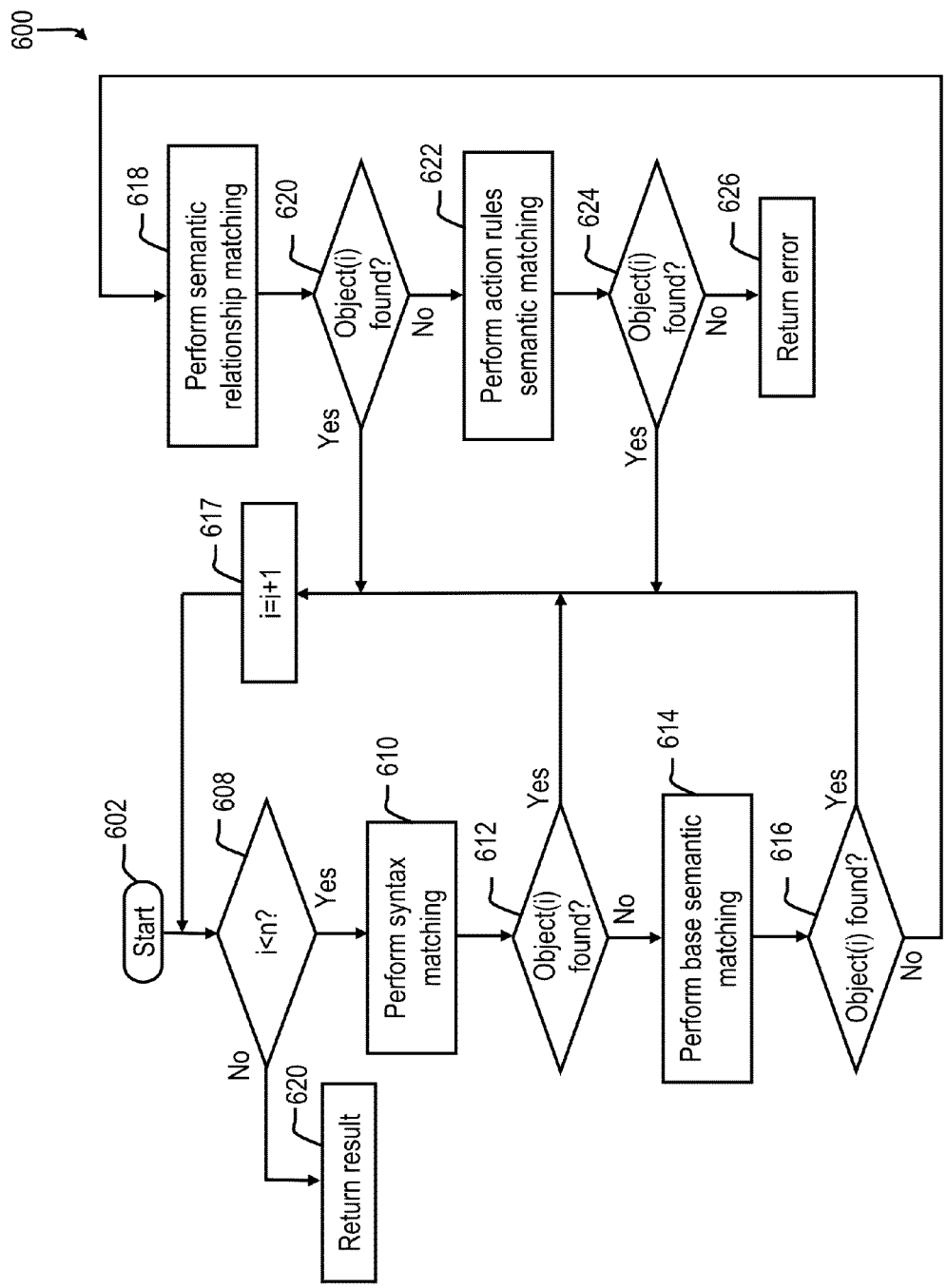
FIG. 6 is a flowchart of an example process for mapping objects using semantic annotations according to one aspect of the present disclosure.

With reference to FIG. 6, an example process 600 for mapping objects using semantic annotations, according to one aspect of the present disclosure, is illustrated. Process 600 is initiated in block 602 subsequent to a user registering a user scenario for a first UI with UIAF 115 and executing the registered user scenario on a second UI (i.e., a revised version of the first UI). As previously mentioned, a user scenario includes a recorded list of actions on objects of a UI. Typically, user scenarios are created for UIs during a development phase. According to aspects of the present disclosure, process 600 is carried out by processor 102. Following block 602, control transfers to decision block 608, where UIAF 115 determines whether 'i' is less than 'n'. In this case, 'i' designates a current object and varies from zero to 'n', where 'n' represents the total number of objects. In general, for each object in a registered user scenario, UIAF 115 searches for an associated object in the second UI. For example, a reference object in a recorded user scenario may be referred to as an old object (oldObject), and a corresponding object in the second UI may be referred to as a current object (currentObject).

In response to 'i' being less than 'n' in block 608, control transfers from block 608 to block 610. In block 610, UIAF 115 performs syntax matching to determine if a current object matches with an old object. Next, in decision block 612, UIAF 115 determines whether the old object (object(i)) is recognized using syntactic information (e.g., object properties, such as name, identifier, and position). In response to UIAF 115 recognizing the old object (i.e., the old object is matched to a current object) using syntactic information, UIAF 115 associates the old object with the current object and proceeds to block 617, where 'i' is incremented for a next object. Following block 617 control returns to block 608. In block 608 when 'i' is not less than 'n', control transfers to block 620 where a result (i.e., a mapping between old objects and current objects) is returned.

In the event that the old object is not recognized using syntactic information in block 612, control transfers to block 614 where base semantic matching is performed by UIAF 115. In this case, an old concept (oldConcept) defined in a semantic annotation of the old object is sent to SE 202. SE 202 searches for the concept in the second UI that semantically matches with the old concept. Next, in decision block 616, UIAF 115 determines whether a current object in the second UI is found with the old concept. In response to UIAF 115 finding a current object with the old concept in block 616, the old object is mapped to the current object and control is transferred to block 617, where 'i' is incremented for a next object, and then to block 608. For example, an old UI may include a username field in a login form that in a later build is changed in name or location. In this case, due to semantic notations, MM 113 is able to recognize that the changed field is the same field.

In the event that UIAF 115 does not find a new object with the old concept in block 616 (i.e., neither syntax nor base semantic matching have provided a viable result), control transfers to block 618, where MM 113 performs semantic relationship matching by employing semantic relationship rules. In this case, the current object may be identified based on matching of the recorded semantic relationship and the semantic relationship in the second UI. As noted above, a semantic relationship rule can be defined as follows: currentObject is the object that MM 113 is looking for; objectRel1 is the object associated to the currentObject with a semantic relationship (Rel1) during recording; objectRel2 is the objectRel1 identified after the recording; and objectsResult includes all of the objects related to objectRel2 by Rel1. If MM 113 is not able to recognize an old object (oldObject), MM 113 can identify the objectRel1 and then map the recognized relation in the current UI. Finally, MM 113 identifies the objectRel2 relationship and the objects associated by Rel1 (objectsResult). In this way, it is possible to identify the object that is the most similar to the old object (oldObject) in the objectsResult based on the semantic relationship. For example, in a table that includes a name list that includes names of individuals in a first field and names of a parent in a second field, if a relationship "is father of" is defined between the two fields the fields can be readily related (for a check point) even if some changes are made to the first and second fields as the semantic relationship between the two fields should remain unchanged.

Next, in decision block 620, UIAF 115 determines whether a match between an old object and a current object is found. In the event a match between an old object and a current object is found in block 620, control transfers to block 617, where 'i' is incremented, and then to block 608. In the event a match between an old object and a current object is not found in block 620 (i.e., UIAF 115 has not located a match for the old object in the second UI based on syntax, base semantics, and/or semantic relationship), control transfers to block 622, where action rules are applied.

The action rules may, for example, be defined using SRM 206. In order to find the old object in the second UI, UIAF 115 may follow a defined semantic rule. For example, the defined semantic rule may be invoked when the object was not present on a UI page, the rule "next" is defined on the same object and the rule "next" was not present during the recording phase, and the object can be referenced on a result page obtained by clicking on "next" button. In other words, when an object cannot be identified in the second UI, MM 113 searches for changes that match with patterns defined in the semantic rules. For example, in a recording phase a UI may include the fields: name, surname, address and a "finish" button (see FIG. 4). In the second UI version the page may be split in two pages linked by "next" button (see FIG. 5). The "next" button can be associated with an ontological concept, such that UIAF 115 can infer that a field that is not on a first page may be located on a second page using the action "Next".

Next, in decision block 624, UIAF 115 determines whether a current object is found that matches the old object. In the event that UIAF 115 locates a current object that matches the old object in block 624, control transfers to block 617, and then to block 608. In the event that UIAF 115 does not locate a current object that matches the old object in block 624, control transfers to block 626 where an error is returned for object(i). The error may, for example, be logged by UIAF 115 for later review by a software quality assurance (SQA) team.

As noted above, the Semantic Web is a collaborative movement led by the W3C. The W3C standard promotes common data formats on the WWW. By encouraging the inclusion of semantic content in web pages, the Semantic Web aims at converting the current Web (Web 2.0), dominated by unstructured and semi-structured documents, into a web of data. According to the W3C, the Semantic Web provides a common framework that allows data to be shared and reused across application, enterprise, and community boundaries. The Semantic Web allows web pages to be located based on semantic annotation and ontology. That is, semantic annotation may be added to all web content and ontology may be employed to cover different concepts. In general, an ontology defines a set of concepts within a domain and relationships among the concepts. Typically, a domain is specific for any single application. In a usual case, semantic annotation binds an object (e.g., an object of UI) or a relationship with a concept or a relation ontology. By inserting semantic annotations in code, relationships between objects are present in an ontology. As such, at runtime, RFT ontologically related objects may be related within a test automation suite.

A goal of the Semantic Web is to publish web content in languages specifically designed for data, e.g., resource description framework (RDF), Web ontology language (OWL), and extensible markup language (XML). Hyper text markup language (HTML) describes documents and the links between them. In contrast, RDF, OWL, and XML can describe arbitrary things, e.g., people, meetings, or places. RDF, OWL, and XML technologies may be combined in order to provide descriptions that supplement or replace the content of Web documents. Thus, content may manifest itself as descriptive data stored in Web-accessible databases or as markup within documents. The machine-readable descriptions enable content managers to add meaning to the content, i.e., to describe the structure of the content. In this way, a computer system can process knowledge itself, instead of text, using processes similar to human deductive reasoning and inference to perform automated information gathering and research. As mentioned above, a UI test is generally created by recording and customizing a number of user scenarios for a UIAF (e.g., RFT and Rational Performance Tester™ (RPT)). Conventionally, test datasets for RPT and RFT are static objects that must be compiled field-by-field.

In general, a test dataset can be inserted into various fields of a UIAF in order to change values in various user scenarios. As used herein, the term 'test dataset' refers to a collection of related data records that supply realistic data values to variables in a test script during test script playback. According to another embodiment of the present disclosure, a test dataset is automatically generated. In one or more embodiments, for each field of a test dataset, a set of valid values are automatically created based on a semantic annotation associated with the field. As one example, consider a form that includes two fields with semantic annotations: 'Name, Surname related to the Son section'; and 'Name, Surname related to the Father section'. Utilizing the semantic annotations, a test dataset may be automatically defined with a name list of the son and a name list of the father with a relationship between the two files available as a verification point.

According to at least one aspect of the present disclosure, a new automated software testing tool component is created that retrieves all instances associated with a semantic annotation. A valid dataset is generated in an automatic way for a specific UI field, and a relationship between the field and another UI field is saved. The relationship between the generated dataset may then be utilized to facilitate a correctness check. Moreover, invalid fields can be defined in order to perform a negative test. For example, a test dataset with an invalid entry for a table including a first field with a name of an individual and a second field with the individual's father's name may include a valid first entry that includes a first field with the name John Jones and a second field with the name James Jones and an invalid second entry with a first field with the name John Jones and a second field with the name Jenny Jones. In this case, the first entry is a semantically and syntactically valid dataset. The second entry, while syntactically valid, is not semantically valid because the relationship is "father of" and the second value is a woman that cannot be a father.

Figure 7:
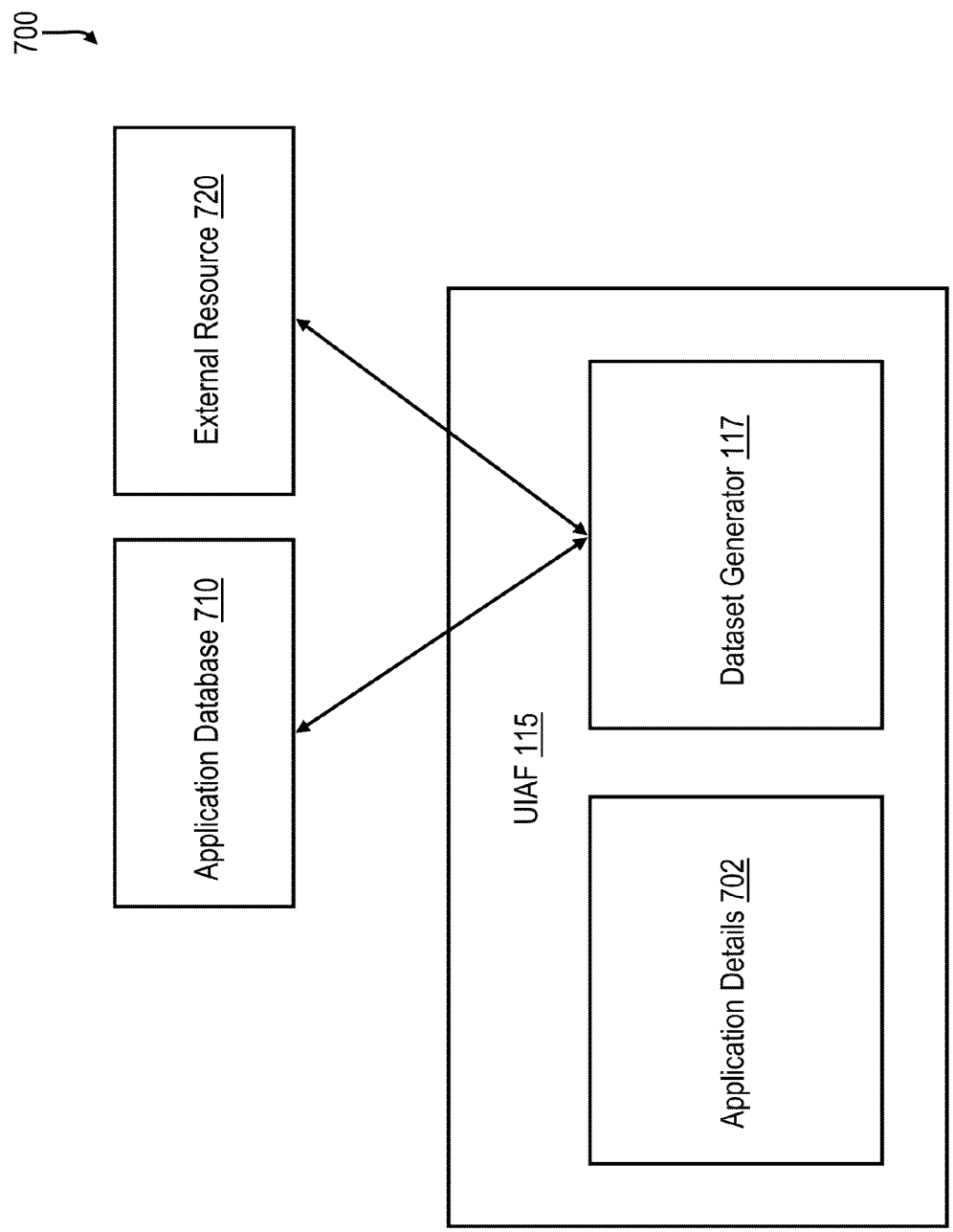
FIG. 7 is a block diagram of an example UIAF that includes a dataset generator configured according to one aspect of the present disclosure.

With reference to FIG. 7, a system 700, configured according to one or more embodiments of the present disclosure, includes UIAF 115 (which includes application details 702 and dataset generator 117), an application database 710, and may include an external resource 720. As previously mentioned, UIAF 115 (e.g., RFT or RPT) is used for UI test automation. Application details 702 represent the application to test. Dataset generator 117 determines values to insert in a test dataset based on a semantic relationship (as given by a semantic annotation) and constraints. In order to retrieve the instances (the values) associated with a semantic concept, dataset generator 117 can access a local database (i.e., application database 710) or retrieve data, e.g., via the Web, from external resource 720. As used herein, the term 'datastore' includes a 'local application database' and a 'remote database'. In one or more embodiments, application database 710 is the database associated with UIAF 115. When application database 710 is semantically annotated, dataset generator 117 can automatically retrieve data from application database 710. External resource 720 includes all resources that are semantically annotated and ontologies that can be retrieved via the Web (e.g., from servers 124 and 126 of FIG. 1).

For existing data, each test dataset includes a header that identifies related fields, e.g., Name, Surname, and Address (see FIGS. 4 and 5). Linking the header to a semantic object (e.g., 'Person'), dataset generator 117 calculates the correct value to insert in the dataset based on the semantic relationship and constraints. In this way, dataset generator 117 can evaluate existing data and create a regular expression that allows system 700 to automatically generate data for the test dataset. The newly created data can then be used during a UI test run. In this manner, a dataset definition may be based on a header definition that includes a semantic annotation. In one or more embodiments, dataset generator 117 retrieves data using, for example, a predefined query to a resource (e.g., a database that is semantically annotated) or a predefined query to a web service.

Figure 8:
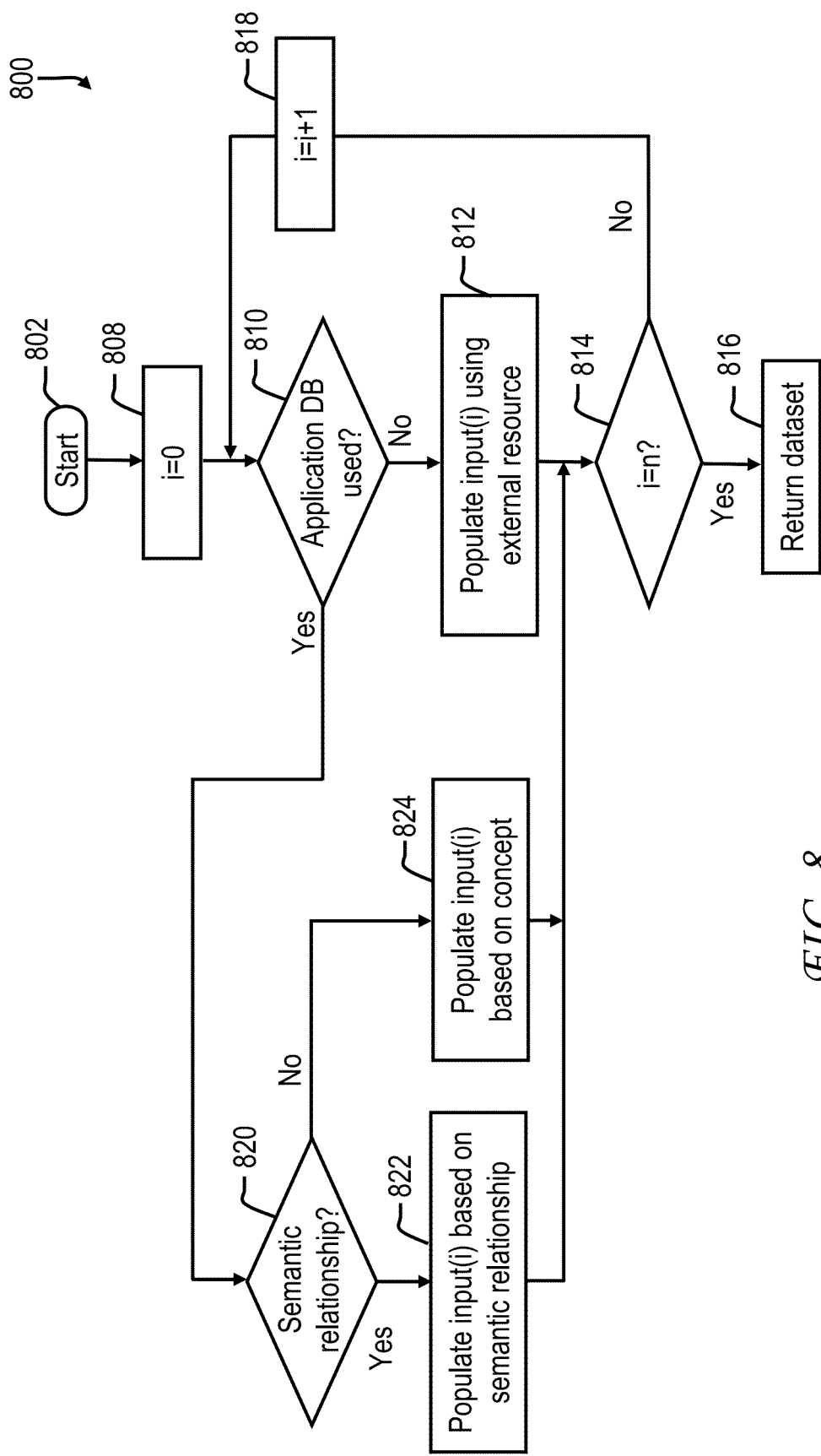
FIG. 8 is a flowchart of an example process for generating datasets using semantic annotations according to one aspect of the present disclosure.

With reference to FIG. 8, a process 800 for automatically inserting values into a test dataset, according to the present disclosure, is illustrated. Process 800 may be executed by processor 102 and is initiated in block 802 subsequent to a user registering a user scenario with UIAF 115 and indicating that the registered user scenario is to be run using different input values. As mentioned above, a user scenario is a recorded list of actions taken on objects of a UI that are usually performed on the UI during a development phase. Next, in block 808 a variable T, which corresponds to the number 'n' of inputs in a dataset, is initialized to zero. Then, in decision block 810, UIAF 115 determines whether application database (DB) 710 or external resource 720 is to be utilized by dataset generator 117 to automatically generate a test dataset for each input value (based on whether a semantic annotation or concept is defined for an input field). In the event that dataset generator 117 is to utilize application database 117 to generate a test dataset, control transfers from block 810 to decision block 820. In general, the concepts are the entities of an ontology while the relationships correlate the entities in the ontology. For example, assuming two concepts 'person' and 'city', a relationship between the two concepts may include 'lives', 'born', 'works', etc. In general, relationships between concepts may be extracted by querying a database that is semantically annotated.

In block 820, dataset generator 117 determines whether a semantic relationship exists. In the event that a semantic relationship exists in block 820, control transfers to block 822, where dataset generator 117 populates input(i) based on the semantic relationship. In the event that a semantic relationship does not exist in block 820, control transfers to block 824 where dataset generator 117 populates input(i) based on a concept. Following blocks 822 and 824 control transfers to block 814, where dataset generator 117 determines if all inputs have been populated. If all inputs have not been populated in block 814, control transfers to block 818, where 'i' is incremented, and then to block 810.

In general, for each input field, dataset generator 117 determines if the data contained in application database 710 can be used (i.e., determines whether a semantic annotation or concept exists). Based on the action that is to be performed, the data contained in application database 710 may or may not be used. For example, if the action is "add a new user" a user already defined in application database 710 cannot be used. When the data contained in application database 710 can be used, dataset generator 117 retrieves all the instances associated with a semantic annotation.

It should be appreciated that a semantic relationship defined in application database 117 is associated in the dataset. Using the semantic relationship defined in application database 117, a set of consistent datasets can be generated. While two input fields may be correlated, if the datasets are generated without consideration of a semantic relationship input field values used during runtime may be inconsistent. For example, assuming a UI includes an 'address' field and a 'zip code' field the two datasets 'Addresses' and 'Zip-Codes' must be populated based on the relationship between the fields (i.e., the zip code is based on the address). In this case, the 'ZipCodes' dataset is calculated using the semantic relationship defined in application database 710. In this manner, values defined in the two datasets provide a value pair whose relationship can also be used during a verification phase.

As one example, a semantic relationship for zip codes may specify that for each address only one zip code is valid. In this case, an address is a primary key of a dataset and an address 'is a part of' a zip code. For example, a table may include an address list and a list of associated zip codes, along with a relationship. As one example, a first table entry may specify an address of 'Ambaradam Street', a zip code of '31045', and a relationship 'is part of'. As another example, a second table entry may specify and address of 'Oberdan Avenue', a zip code of '31267', and a relationship 'is part of'. As yet another example, a third table entry may specify an address of 'Italy Street', a zip code of '31045', and a relationship of 'is part of'. Dataset generator 117 can then retrieve data from an external resource (e.g., a web site) using a query that requests zip codes for each address.

As another example, a UI form may include: a name field; a surname field, and a button that triggers an action to calculate the father. In the event that application database 710 includes semantically annotated information and the concepts father and son are linked with a semantic relationship, a test dataset can be automatically populated by dataset generator 117. In this case, dataset generator 117 creates a dataset 'son' with all the information of the persons defined as son, a dataset 'father' with all the information of the persons defined as father, and a semantic relationship between the datasets 'son' and 'father'. During the test execution, a registered user scenario is executed with all the data in the dataset 'son', and the result of the action 'Calculate the father' is verified with the 'father' dataset using the semantic relationship between datasets.

In block 810, if application database 710 cannot be used, control transfers to block 812 where dataset generator 117 searches for data in external resource 720 (e.g., a Web-accessible external database). Following block 812, control transfers to decision block 814, where dataset generator 117 determines if all inputs have been populated. If all inputs have not been populated in block 814, control transfers to block 818, where 'i' is incremented, and then to block 810. If all inputs have been populated in block 814, control transfers to block 816, where a dataset is returned to UIAF 115. In general, dataset generator 117 searches for instances of a concept defined in the field. The instances of the concept are a list of values that are related to a concept in an ontology. Dataset generator 117 also searches for instance values with a relationship as defined in the UI. For example, the 'address' field and the 'zip code' field are calculated considering the relationship between the fields.

Accordingly, techniques have been disclosed herein that utilize semantic annotations to map objects and populate datasets.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of operating a user interface automation framework, comprising:
    accessing, using a dataset generator executing on a data processing system, a datastore that includes semantic annotations;
    identifying, using a mapping generator executing on the data processing system, a first semantic annotation, included in the semantic annotations, that defines a relationship between a first field and a second field of an original object of a user scenario for an original user interface;
    identifying, using the mapping generator executing on the data processing system, a second semantic annotation that matches the first semantic annotation, wherein the second semantic annotation defines a relationship between a first field and a second field of a modified object of a revised user interface, and wherein the modified object includes an entry in at least one of the first and second fields that is changed from an entry in a corresponding one of the first and second fields in the original object;
    mapping using the mapping generator executing on the data processing system, the original object of the user scenario to the modified object based on the first and second semantic annotations;
    generating, using the dataset generator, input values for a test dataset from the datastore based on one or more of the semantic annotations;
    wherein the dataset has an associated header that identifies related fields and includes a semantic annotation; and
    testing the revised user interface according to the user scenario using the generated input values for the test dataset.

2. The method of claim 1, wherein the generating input values for a test dataset from the datastore based on the semantic annotations further comprises:
    generating correlated input values for the test dataset based on a semantic relationship between input fields.

3. The method of claim 1, wherein the datastore is a local application database.

4. The method of claim 1, wherein the datastore is a remote database.

5. The method of claim 1, wherein the dataset generator is included in the user interface automation framework.

6. A computer program product, comprising: a computer-readable storage memory; and computer-readable code embodied on the computer-readable storage memory, wherein the computer-readable code, when executed by a processor of a data processing system, causes the processor to:

access a datastore that includes semantic annotations;
identify a first semantic annotation, included in the semantic annotations, that defines a relationship between a first field and a second field of an original object of a user scenario for an original user interface;
identify a second semantic annotation that matches the first semantic annotation, wherein the second semantic annotation defines a relationship between a first, field and a second field of a modified object of a revised user interface, and wherein the modified object includes an entry in at least one of the first and second fields that is changed from an entry in a corresponding one of the first and second fields in the original object;
map the original object to the modified object based on the first and second semantic annotations;
generate input values for a test dataset from the datastore based on one or more of the semantic annotations;
wherein the dataset has an associated header that identifies related fields and includes a semantic annotation; and
test the revised user interface according to the user scenario using the generated input values for the test dataset.

7. The computer program product of claim 6, wherein the computer-readable code, when executed by the processor of the data processing system, further causes the processor to:
generate correlated input values for the test dataset based on a semantic relationship between input fields.

8. The computer program product of claim 6, wherein the datastore is a local application database.

9. The computer program product of claim 6, wherein the datastore is a remote database.

10. The computer program product of claim 6, wherein the dataset generator is included in the user interface automation framework.

11. A data processing system, comprising: a memory system; and a processor coupled to the memory system, wherein the processor is configured to:
access a datastore that includes semantic annotations;
identify a first semantic annotation, included in the semantic annotations, that defines a relationship between a first field and a second field of an original object of a user scenario for an original user interface;
identify a second semantic annotation that matches the first semantic annotation, wherein the second semantic annotation defines a relationship between a first field and a second field of a modified object of a revised user interface, and wherein the modified object includes an entry in at least one of the first and second fields that is changed from an entry in a corresponding one of the first and second fields in the original object;
map the original object to the modified object based on the first and second semantic annotations;
generate input values for a test dataset from the datastore based on one or more of the semantic annotations;
wherein the dataset has an associated header that identifies related fields and includes a semantic annotation; and
test the revised user interface according to the user scenario using the generated input values for the test dataset.

12. The data processing system of claim 11, wherein the processor is further configured to:
generate correlated input values for the test dataset based on a semantic relationship between input fields.

13. The data processing system of claim 11, wherein the datastore is a local application database.

14. The data processing system of claim 11, wherein the datastore is a remote database.

* * * * *